(No Model.)
J. W. DIXON
APPARATUS FOR RECOVERING SODA USED IN MANUFACTURE OF PAPER PULP.
No. 291,993. Patented Jan. 15, 1884.
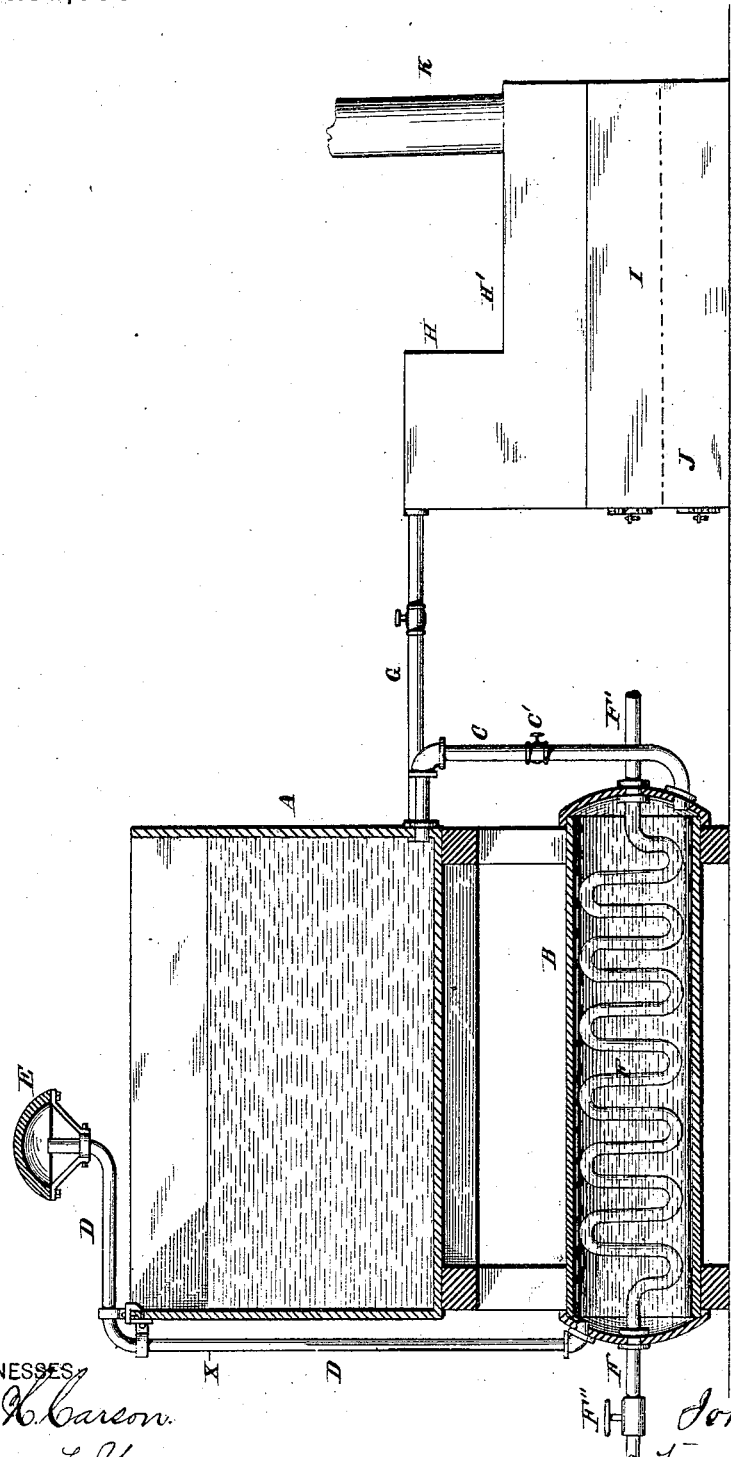

UNITED STATES PATENT OFFICE.

JOHN W. DIXON, OF PHILADELPHIA, PENNSYLVANIA.

APPARATUS FOR RECOVERING SODA USED IN MANUFACTURE OF PAPER-PULP.

SPECIFICATION forming part of Letters Patent No. 291,993, dated January 15, 1884.

Application filed November 30, 1883. (No model.)

*To all whom it may concern:*

Be it known that I, JOHN W. DIXON, a citizen of the United States, and a resident of Philadelphia, Pennsylvania, have invented a new and useful Improvement in Apparatus for Recovering Soda used in the Manufacture of Paper-Pulp; and I do hereby declare the following to be a full, clear, and exact description of the same, reference being had to the annexed drawing, making part hereof.

The nature of my invention will fully appear from the following description and claims.

The drawing represents a vertical longitudinal sectional view of my apparatus with an incinerating-furnace in elevation.

A is the tank to contain the refuse liquor from which the soda used in the manufacture of paper-pulp is to be extracted; B, a cylinder or closed chamber in which the liquor is to be heated and through which it is circulated; C, a pipe or tube to conduct the liquor from the lower part of tank A to the chamber B; C', a cock or valve upon the pipe C; D, a pipe or tube to convey the liquor in circulation from the chamber B back to the upper part of tank A; E, a shield or distributer upon the end of tube D, to break the ascending column of circulating liquor to permit the vapor or steam to escape and the liquor to drop into the tank A.

F is a steam-heating pipe or tube, entering the cylinder or chamber B and coiled therein, passing out thereof into the tube F'. The object of the tube F is to conduct steam from a steam-boiler into a coil or series of tubes within the chamber B, and that of the tube F' is to conduct the steam or whatever condensation may occur back to the steam-boiler from which it came. The object of the coil or series of pipes within the chamber B is to heat the contents of this chamber B by conducting a current or currents of steam or hot water through the interior of the chamber B.

G is a tube to conduct the contents of tank A to an incinerating apparatus, H H' I J K, H being the first receiving-tank for the concentrated liquor; H', the secondary receiving-tank; I, the incinerating-hearth; J, the furnace; K, the stack or chimney.

The construction of incinerating or calcining furnaces is well known in the art, and described in United States Patents heretofore granted to me. I will therefore confine my description to what I consider the novel parts of my device. The liquor resulting from the reduction of vegetable and other fiber to paper-pulp is a solution of caustic soda and water, and after the process of reducing the fiber to pulp is completed this solution is charged with foreign matters extracted from the fibers in the process of reduction; and my invention relates particularly and has for its object an economical means of recovering the soda from the solution after such use. This solution after such use is generally known in the arts as "waste liquor." My invention is also applicable to analogous processes, in fact wherever it is desired to concentrate a liquor rapidly and economically—for instance, evaporating brine to recover the salt, or a solution containing saccharine matter to recover the latter, &c. The solution to be concentrated is first pumped or placed in the tank A. The cock C' is then opened until the chamber B is also filled with the solution. The solution then, seeking its level, will rise in the pipe D to the point X. The cock or valve F'' is then opened and steam or hot water then flows or forces itself through the pipe F, through the coil or series of pipes within the chamber B, and out through the exit-pipe F', whence it is either returned to the boiler or allowed to escape. In a short time the contents of the chamber B will be heated above the boiling-point, and sufficient steam will be created in the mass in the liquor in chamber B to produce a pressure within this chamber to force the liquor up through pipe D and out of the same and project it against the shield E, whence it will fall back into the tank A, the steam rising from the liquor as it falls. The weight of the liquor in tank A will prevent the forcing back of the contents of chamber B through the pipe C, and the liquor within the tank A and pipe C will also be cooler, and therefore heavier, than that in the chamber B.

The lightness of the thin column of liquid between the point X and the chamber B will induce the liquor under pressure in the chamber B to seek an exit through the pipe D. This operation will start the circulation, which is sustained continuously until the mass of liquor in tank A is sufficiently concentrated.

As the operation continues the mass in tank A will gradually become highly heated, and evaporation will progress from its surface. It will also be observed that the heating agent passing through the pipe F will be at its highest temperature at and near the point of its entrance into the chamber B. It will also be evident that the liquor within the chamber B will be at its lowest temperature at and near the point of its entrance into said chamber from the pipe C, and will gradually rise in temperature as it approaches the opposite end of chamber B toward the pipe D. The heating agent in pipe F, on the contrary, as it gradually imparts its heat to the contents of chamber B, will fall in temperature as it approaches its exit end, F'. The liquor within chamber B, being of higher temperature at its exit end, will be the more easily raised through the pipe D. It will be apparent that the hotter the contents of the tank A become the less steam or heating agent will be required in chamber B, and the more effective the operation will become.

While I have described the steam as entering in chamber B at the exit end of the contents of the latter, the direction can be reversed, and the heating agent may enter through the pipe F' and flow out through the pipe F. My apparatus is effective even with this arrangement, but I prefer the former.

When my apparatus is used to recover the soda from waste liquor used in reducing fiber to paper-pulp, I employ in connection with it a calcining apparatus, and when the liquor in the tank A is sufficiently concentrated for transfer to the calcining apparatus for further treatment, I open the cock upon pipe G and permit the contents of tank A to run into the calcining apparatus.

The character or construction of the steam-pipes in the chamber B can be much varied. Instead of the coil of pipe, an internal steam-cylinder could be used, or the pipe F might distribute the steam into a series of internal steam-chambers, or the chamber B may be made the interior cylinder and its contents heated by a steam-jacket.

For the purposes of my claim I shall use the generic word "chamber," and desire to be understood that by such a term is comprehended the space inclosed by the walls or shell of a coil, series of tubes, series of chambers, or a single chamber. I may place the tank A over a furnace to assist in the evaporation, or it may be additionally heated in any other way by direct fire or waste furnace-heat. This course will facilitate the operation of my apparatus, particularly in starting up the heat during the beginning of the process.

What I claim as new is—

1. In combination with a concentrating-tank, A, an additional heating-chamber, B, the contents of which are heated by contact with the walls of a steam or hot-water chamber, F, tube C, to conduct the contents of tank A to chamber B, and exit-pipe D, to return the heated contents of chamber B to the concentrating-tank A, whereby the liquor is heated and an automatic circulation of the same is sustained, substantially as described.

2. In combination with a concentrating-tank, A, an additional heating-chamber, B, the contents of which are heated by a steam-heated surface, tube C, to conduct the contents of tank A to chamber B, and exit-pipe D, to return the heated contents of chamber B to the concentrating-tank A, whereby the liquor is heated and an automatic circulation of the same is sustained, substantially as described.

3. In combination with a concentrating-tank, A, an additional heating-chamber, B, the contents of which are separated by a shell from a steam or hot-water chamber, whereby said contents are heated, tube C, to conduct the contents of tank A to chamber B, and exit-pipe D, to return the heated contents of chamber B to the concentrating-tank A, whereby the liquor is heated and an automatic circulation of the same is sustained, substantially as described.

JOHN W. DIXON.

Witnesses:
WM. H. CARSON,
GEORGE E. BUCKLEY.